United States Patent [19]

Matsudaira et al.

[11] 4,006,313

[45] Feb. 1, 1977

[54] TRANSMITTING AND REPRODUCING SYSTEM HAVING IMPROVED NOISE REDUCTION CHARACTERISTICS FOR QUADRAPHONIC AUDIO INFORMATION SIGNALS

[75] Inventors: Takeshi Matsudaira, Kamakura; Shoichi Nakamura, Tokyo, both of Japan

[73] Assignee: Sony Corporation, Tokyo, Japan

[22] Filed: Dec. 19, 1974

[21] Appl. No.: 534,299

[30] Foreign Application Priority Data

Dec. 20, 1973 Japan ........................... 48-143326

[52] U.S. Cl. ........................ 179/15 BT; 179/1 GQ; 179/100.4 ST; 179/100.1 TD; 333/14

[51] Int. Cl.[2] ........................................... G11B 3/74

[58] Field of Search ......... 179/100.1 TD, 100.4 ST, 179/1 GQ, 15 BT, 15 BS; 325/136, 137, 65; 333/14

[56] References Cited

UNITED STATES PATENTS

| | | | |
|---|---|---|---|
| 2,874,221 | 2/1959 | Dauguet | 179/100.1 TD |
| 3,311,828 | 3/1967 | Chasek | 325/136 |
| 3,665,345 | 5/1972 | Dolby | 333/14 |
| 3,735,290 | 5/1973 | Yamazaki | 333/14 |
| 3,761,628 | 9/1973 | Bauer | 179/100.4 ST |
| 3,869,583 | 3/1975 | Bauer et al. | 179/100.1 TD |

*Primary Examiner*—Bernard Konick
*Assistant Examiner*—Alan Faber
*Attorney, Agent, or Firm*—Lewis H. Eslinger; Alvin Sinderbrand

[57] ABSTRACT

A transmitting and reproducing system includes an encoder for selectively combining at least four signals for transmission along two channels. At least three of the signals are combined in a predetermined amplitude and phase relationship to form a first unmodulated signal and at least one of the three signals is used to vestigially modulate a carrier. The unmodulated signal and the modulated carrier are combined for transmission along one of the channels. A different grouping of three of the signals are combined in a different predetermined amplitude and phase relationship to form a second unmodulated signal, and at least one signal different from the first modulating signal is used as a second modulating signal for vestigial modulation of the carrier. The second unmodulated signal and the carrier modulated by the different signal are combined for transmission on the second channel. The signals used to modulate the carrier are passed through noise reduction circuits that have frequency response characteristics that compress signal components above a frequency that depends upon the amplitude of the signals passing through the noise reduction circuits. The reproducing part of the system includes a decoder that selectively combines the composite signal on each of the channels with the demodulated signals from the two signals that were originally modulated, thereby reproducing two main signals without interference.

13 Claims, 9 Drawing Figures

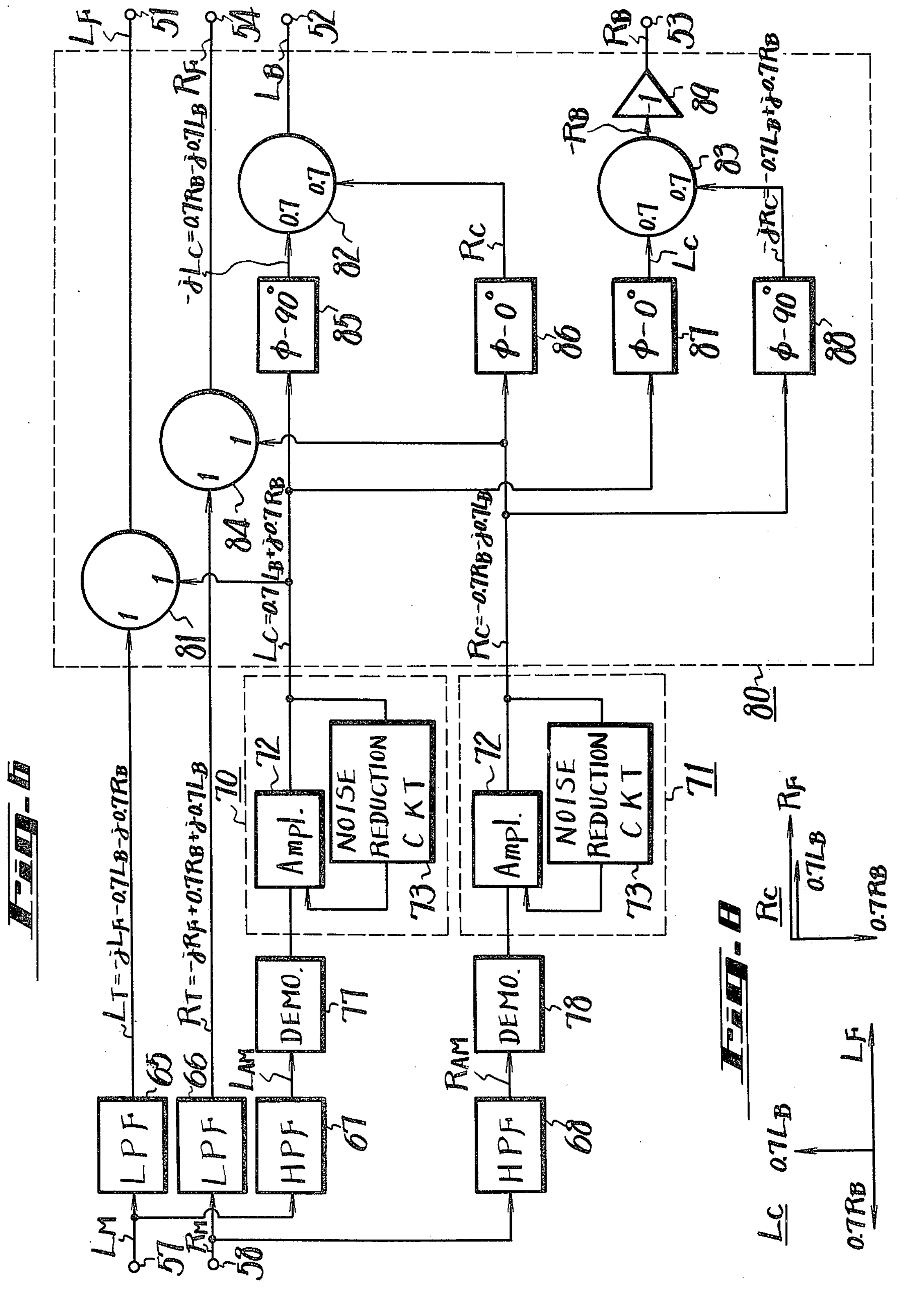

TRANSMITTING AND REPRODUCING SYSTEM HAVING IMPROVED NOISE REDUCTION CHARACTERISTICS FOR QUADRAPHONIC AUDIO INFORMATION SIGNALS

BACKGROUND OF THE INVENTION

1. Field of the Invention

The present invention relates to an audio system adapted to record or transmit four or less individual channels of audio information containing directional information on a two-track recording medium or transmitting medium and to reproduce the recorded or transmitted information as four or less discrete audio output signals.

2. Description of the Prior Art

Audio recording and reproducing systems sometimes called stereo-quadraphonic because they involve more channels than a stereophonic system, are generally divided into matrix types and carrier types at present. By way of example, the type referred to as the SQ system is a matrix system. It includes left front, left back, right back and right front signals $L_F$, $L_B$, $R_B$, and $R_F$ encoded into two composite signals $L_T$ and $R_T$ according to the following equation:

$$L_T = L_F + 0.707\ R_B - j0.707\ L_B$$

$$R_T = R_F - 0.707\ L_B = j0.707\ R_B \qquad (1)$$

The composite signals $L_T$ and $R_T$ expressed by equation (1) are decoded by a decoder to reproduce the original signals according to the following equation:

$$\begin{aligned} L_F' &= L_F + 0.707\ R_B - j.0.707\ L_B \\ L_B' &= L_B - 0.707\ R_F + j0.707\ L_F \\ R_B' &= R_B + 0.707\ L_F - j0.707\ R_F \\ R_F' &= R_F - 0.707\ L_B + j0.707\ R_B \end{aligned} \qquad (2)$$

Since four original signals are thus converted into two composite signals by a matrix, the SQ system is compatible with prior art stereophonic record players and hence two-channel stereophonic reproducing apparatus can, without change, reproduce the two composite signals. The four reproduced signals expressed by equations (2) correspond to the four original signals, but other signals are mixed with them as crosstalk signals. As a result, the separation of the four signals cannot be complete. For this reason, decoders using a special logic circuit have been proposed to obtain a degree of separation that is sufficient from a practical point of view. However, no separation equal to that of a discrete type is possible at present.

A carrier type of the quadraphonic system, called a CD-4 system, is disclosed in U.S. Pat. No. 3,686,471. According to that system, a first composite signal consisting of a main channel signal $L_F + L_B$ and a sub-channel signal which is obtained by angularly modulating a carrier signal of 30KHz with a subtraction signal $L_F - L_B$, and a second composite signal consisting of a main channel $R_F + R_B$ and a sub-channel signal, which is obtained by angularly modulating the carrier signal of 30 KHz with a subtraction signal $R_F - R_B$, are recorded on one sound groove. Four discrete signals $L_F$, $L_B$, $R_B$ and $R_F$ are obtained at the reproducing side by demodulation and matrixing. In this case, the band of the sub-channel signal is selected, for example, between 20KHZ and 50 KHz, so that a specially designed pickup cartridge is required, which is difficult to obtain.

U.S. Pat. No. 3,761,628 discloses a method by which four discrete signals are reproduced by a conventional pickup cartridge. With this system, a matrixed signal is contained in a main channel signal and a modulated signal is contained in a sub-channel signal. The modulated signal contains a signal component which may cancel the crosstalk signals of the main channel at the reproducing stage. However, since signals contained in the sub-channel are in the form of a single side band (SSB) signal, it is not possible to transmit or reproduce information with a good signal-to-noise (S/N) ratio.

SUMMARY OF THE INVENTION

It is a principal object of the present invention to provide an improved system for transmitting or recording four or more discrete audio information signals on two channels and for reproducing the same to deliver four or more discrete output signals.

It is another object of this invention to provide a system for transmitting and reproducing a plurality of audio information signals in which the band width of a sub-channel or a carrier channel is made as narrow as possible for transmitting or recording the same and hence the recorded signal can be reproduced by ordinary reproducing apparatus.

It is a further object of this invention to provide a transmitting and reproducing system for a plurality of audio information signals in which the band width of a sub-channel is narrow but a reproduced signal can be obtained with good S/N ratio.

It is a still further object of this invention to provide a transmitting and reproducing system which has provided with means for producing a carrier channel signal in a vestigial side band and a noise reduction circuit and the lower or upper frequency of the vestigial side band selected to be relatively close so that the transmitting and reproducing system can be simple and a signal having a good S/N ratio can be obtained.

The above, and other objects, features and advantages of this invention, will become apparent from the following description taken in conjunction with the accmpanying drawings.

BRIEF DESCRIPTION OF THE DRAWINGS

FIG. 6 is a block diagram illustrating a preferred embodiment of a decoder or reproducing system arranged according to this invention.

FIG. 8 is a diagram illustrating phasor groups to be contained in the vestigial side band carrier signal according to another embodiment of this invention.

DESCRIPTION OF THE PREFERRED EMBODIMENTS

An embodiment of the present invention will be hereinafter described with reference to the drawings.

Figure 1:
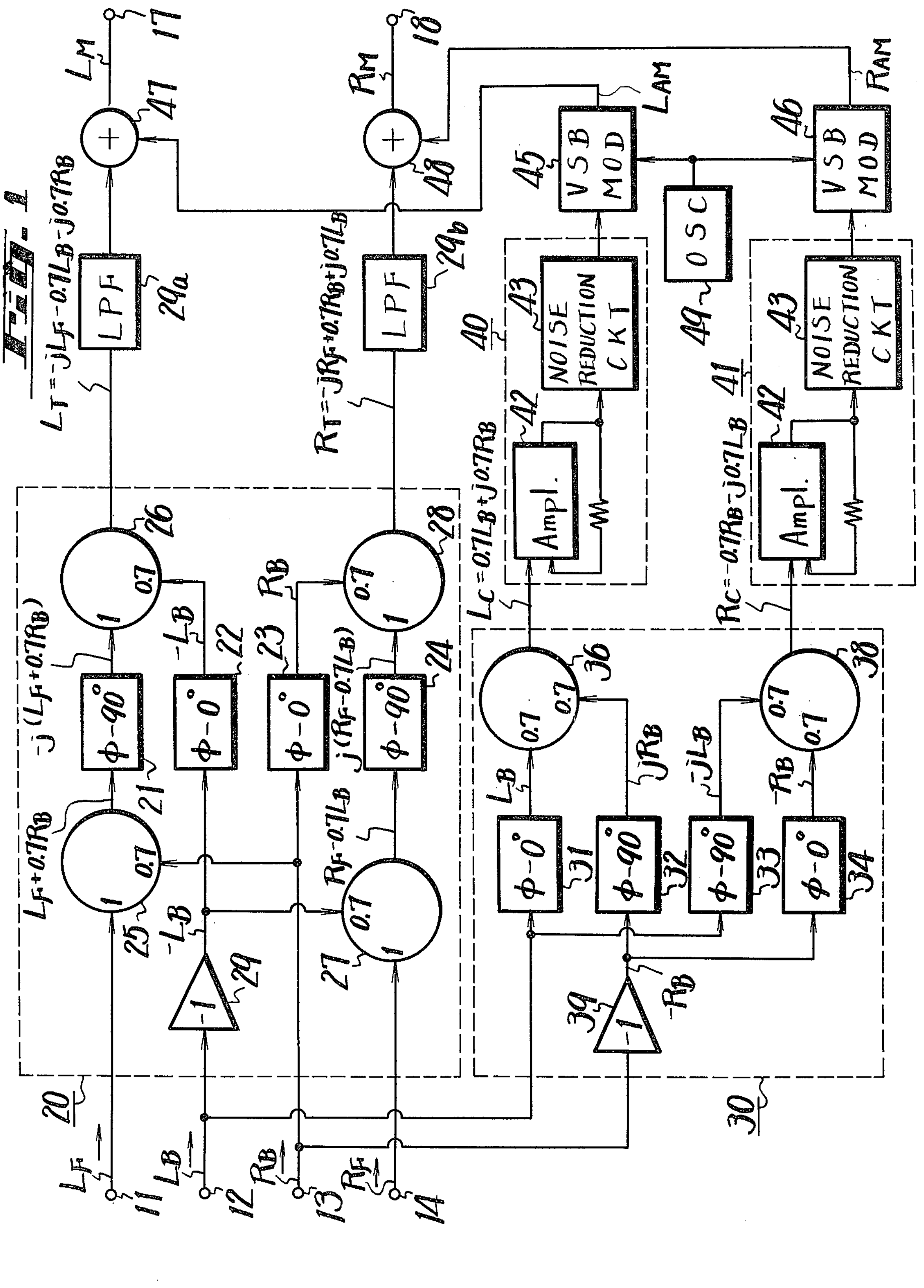
FIG. 1 is a block diagram illustrating a preferred embodiment of an encoding system arranged according to this invention for encoding four channels of audio information signals on a two-channel transmission line.

FIG. 1 shows an embodiment of an encoder system according to the invention in which four-channel stereophonic signals $L_F$, $L_B$, $R_B$, and $R_F$ are supplied to an encoder circuit 20 through input terminals 11, 12, 13, and 14, respectively. The encoder circuit 20 may be similar to the encoder circuit used in the previously known SQ system. In the encoder circuit 20, the signals $L_F$ and $R_B$ are added in a matrixing circuit 25 with the level ratio of 1–: 0.7 to provide a signal $L_F + 0.7R_B$. This signal is then applied to a phase shifter 21 to be phase-shifted by $\phi - 90°$, where $\phi$ may be taken as zero for the sake of brevity, to form a signal $-jL_F - j0.7R_B$.

The signal $L_B$ is inverted by an inverter 29 into a signal $-L_B$ which is then applied to a phase shifter 22 to be phase-shifted by $\phi$ to form the signal $-L_B$. The signals $-jL_F - j0.7R_B$ and $-L_B$ from the phase shifters 21 and 22 are added in a matrixing circuit 26 at the amplitude ratio of 1 : 0.7. As a result, the matrixing circuit 26 produces a composite signal $L_T = -jL_F - 0.7L_B - j0.7R_B$ that contains the signal $L_F$ as its main signal component and the signals $R_B$ and $L_B$ at the level of −3dB with the same phase and delayed by 90°.

Further, in the encoder circuit 20, the signal $R_B$ is applied to a phase shifter 23 to be phase-shifted $\phi$ to form the signal $R_B$. The signal $R_F$ and the signal $-L_B$ from the inverter 29 are added in a matrixing circuit 27 at the amplitude ratio of 1:0.7 to be a signal $R_F - 0.7L_B$. This signal $R_F - 0.7L_B$ is applied to a phase shifter 24 to be phase-shifted by $\phi$ $\pi°$ to form a signal $-jR_F + j0.7L_B$. The signal $-jR_F + j0.7L_B$ from the phase shifter 24 and the signal $R_B$ from the phase shifter 23 are added in a matrixing circuit 28 at the amplitude ratio of 1 : 0.7 produce a composite signal $R_T = -jR_F + 0.7R_B + j0.7L_B$ that contains the signal $R_F$ in phase with the signal $L_F$ as its main signal component and the signals $L_B$ and $R_B$ at the level of −3dB with the same phase and advanced by 90°. The composite signals $L_T$ abd $R_T$ from the matrixing circuits 26 and 28 are applied to low pass filters 29a and 29b, respectively, each of which has a cut-off frequency at or near the highest audio frequency of interest, typically 15KHz.

In accordance with this invention, the signals $L_B$ and $R_B$ are also supplied to a second encoder circuit 30. More specifically, the signal $L_B$ is applied to a phase shifter 31 to be phase-shifted by $\phi$ to form the signal $L_B$. The signal $R_B$ is applied to an inverter 39 to be converted into a signal $-R_B$ which is then applied to a phase shifter 32 to be phase-shifted by $\phi - 90°$ to form a signal $jR_B$. The signals $L_B$ and $jR_B$ from the phase shifters 31 and 32 are added in a matrixing circuit 36 at the amplitude ratio of 0.7 : 0.7 to produce a composite signal $L_C = 0.7L_B + ,0.7R_b$ of the signals $L_B$ and $R_B$ in opposite phase from the components $L_B$ and $R_B$ in the composite signal $L_T$. Further, in the second encoder circuit 30, the signal $L_B$ is applied to a phase shifter 33 to be phase-shifted by $\phi - 90°$ to form a signal $-jL_B$. The signal $-R_B$ from the inverter 39 is applied to a phase shifter 34 to be phase-shifted by $\phi$ to form a signal $-R_B$. The signals $-jL_B$ and $-R_B$ from the phase shifters 33 and 34 are added in a matrixing circuit 38 at the amplitude ratio of 0.7 : 0.7 to produce a composite signal $R_C = -0.7R_B - j0.7L_B$ of the signals $R_B$ and $L_B$ in opposite phase to the components $R_B$ and $L_B$ in the composite signal $R_T$. The bands of these signals $L_T$, $R_T$, $L_C$, and $R_C$ are selected for example, between 30Hz and 15KHz.

Figure 2:
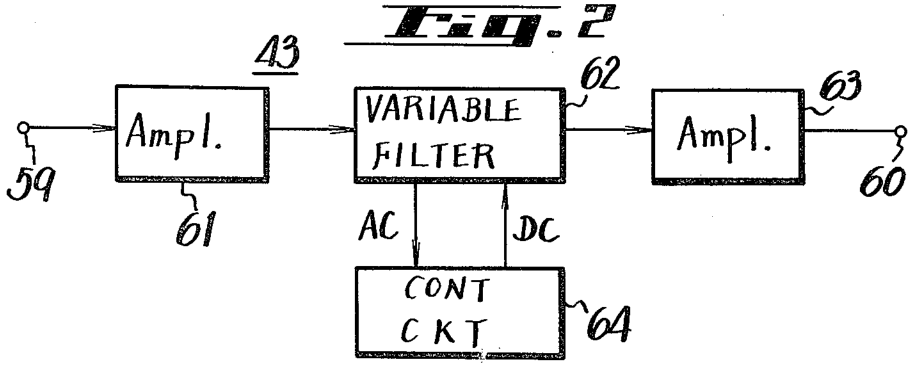
FIG. 2 is a block diagram illustrating, in more detail, the noise reduction circuit used in the system depicted in FIG. 1.
Figure 3A:
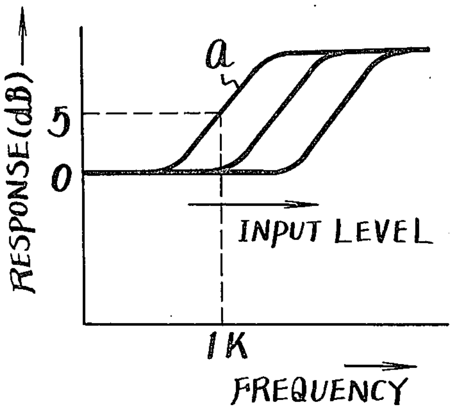
FIGS. 3A and 3B are graphs showing band variation operations of the encoder and decoder of the circuit depicted in FIG. 2.
Figure 4:
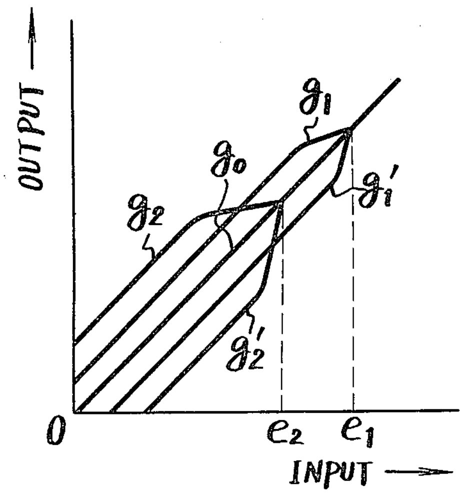
FIG. 4 is a graph showing the input-output characteristics of the circuit depicted in FIG. 2.

The signals $L_C$ and $R_C$ from the encoder circuit 30 are respectively supplied to similar noise reducing encoder circuits 40 and 41. Each of the noise reduction encoder circuits 40 and 41 has a main amplifier 42 with a resistor connected in its negative feedback loop and a noise reduction circuit 43. The noise reduction circuit 43 may be constituted, for example, as shown on FIG. 2, to include an input terminal 59, an output terminal 60, an amplifier 61 of low output impedance, a variable filter 62, an amplifier 63 of high input impedance, and a control circuit 64 for the variable filter 62. The control circuit 64 detects and responds to the level of the input signal as well as responding to the frequency of the input signal. A circuit of this type is disclosed in U.S. Pat. No. 3,911,371, issued Oct. 7, 1975 and assigned to the assignee of the present application. As shown in FIG. 3A, the encoder characteristics of the noise reduction encoders 40 and 41 have high band emphasis characteristics, and hence, when the input level is low, the frequency characteristic is indicated by a curve *a* and the cut-off frequency becomes low. At higher input levels the frequency response shifts to the right. As may be understood from FIG. 3A, the encoder characteristics are such that when the input level is low, the extent of the gain increase for all but relatively low frequencies is made great. In this case, it should be noted that when relatively low level signals are present those low level signals of high frequency are amplified in increasing amount. The output-input characteristics of the noise reduction encoders 40 and 41 are shown in FIG. 4 by a curve $g_1$ relative to a linear line $g_0$. By way of example, FIG. 4 represents the condition when the encoder operation is carried out for an intermediate frequency signal when its input lever is lower than $e_1$, and when the encoder operation is carried out for a high frequency signal when its input level is lower than $e_2$, $e_1$ being of higher amplitude than $e_2$. The maximum encoder characteristics of the noise reduction encoders 40 and 41 are shown in FIG. 3A by a curve *a*, and the frequency of an input signal which is raised by 5dB at which the noise reduction effect is sufficiently carried out is about 1KHz.

Figure 5:
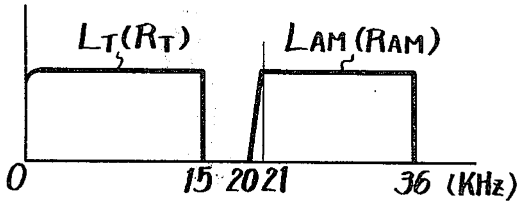
FIG. 5 is a diagram illustrating the frequency distribution of the base band and vestigial side band carrier signal according to the preferred embodiment of the invention depicted in FIG. 1.

The signals $L_C$ and $R_C$ passed through the noise reduction encoders 40 and 41 are supplied to modulator circuits 45 and 46, respectively, as modulating signals. The modulator circuits 45 and 46 are supplied with the same carrier signal from an oscillator circuit 49. The carrier signal has a frequency of, for example, 21KHz. Thus, the signals $L_C$ and $R_C$ are converted into amplitude-modulated signals $L_{AM}$ and $R_{AM}$ which occupy the higher band of the signals $L_T$ and $R_T$, respectively. In this case, each of the modulator circuits 45 and 46 is an amplitude modulator circuit that produces a vestigial side band signal and includes a high pass filter. As shown in FIG. 5, the carrier frequency is selected, for example, as 21KHz so that its upper side band is between 21KHz and 36KHz and its lower side band, except the vestigial band between 20 KHz and 21KHz, is eliminated. The limit frequency (1 KHz) of the AM signal in the lower side band is selected substantially equal to a frequency at which the noise reduction effects of the encoders 40 and 41 are achieved.

The AM signals $L_{AM}$ and $R_{AM}$ are supplied to adder circuits 47 and 48, respectively, and the signals $L_T$ and $R_T$ from the encoder circuit 20 are also applied to the adders 47 and 48, respectively. Thus, the adders 47 and 48 deliver multiple signals $L_M = L_T + L_{AM}$ and $R_M = R_T + R_{AM}$to a pair of output terminals 17 and 18. Thus, the multiple signals $L_M$ and $R_M$ may be recorded on a standard record disc or a magnetic tape, or may be broadcast by a broadcasting station.

FIG. 6 shows an embodiment of the decoder system according to the invention. In this embodiment, the signals $L_M$ and $R_M$ reproduced from a record disc, a magnetic tape, or a radio receiver are applied to two input terminals 57 and 58 connected to two low pass filters 65 and 66 that allow the signals $L_T$ and $R_T$, respectively, to pass therethrough. The signals $L_T$ and $R_T$ are then supplied to a decoder circuit 80.

The signals $L_M$ and $R_M$ from the terminals 57 and 58 are also applied to a pair of high pass filters 67 and 68 that allow the AM signals $L_{AM}$ and $R_{AM}$, respectively, to pass therethrough. These AM signals $L_{AM}$ and $R_{AM}$ are applied to two democulator circuits 77 and 78 of a vestigial side band system, respectively. The output signals from the demodulator circuits 77 and 78 are then supplied to two decoers 70 and 71 for noise reduction. Output signals $L_C$ and $R_C$ from the decoders 70 and 71 are supplied to the decoder circuit 80.

Each of the noise decoders 70 and 71 consists of a main amplifier 72 which has a noise reduction circuit 73 in its negative feedback loop.

Figure 3B:
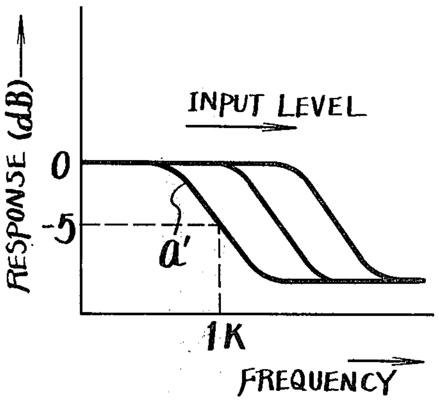

Each of the noise reduction circuits 73 is similar in construction to the noise reduction circuit 43 (FIG. 2) of the noise reduction encoders 40 and 41 shown in FIG. 1, but in the decoders 70 and 71, the amount of negative feedback is increased at high frequency. Hence, as shown in FIG. 3B, the characteristics of the decoders 70 and 71 are complementary to those of the encoders (FIG. 3A). Thus, when the input signal level is low, the frequency characteristic is shown by a curve $a'$ in FIG. 3B. In other words, when the levels of the input signals having intermediate frequencies are applied to the noise reduction decoders 70 and 71 are low, the gain is relatively great but decreases as the signal level increases. As between signals of the same low level, the gain decreases with increases in the signal frequency. The input-output characteristics of the noise reduction decoders 70 and 71 are shown by curves $g_1'$ and $g_2'$ in FIG. 4 as compared with those of the encoders shown by curves $g_1$ and $g_2$ in the same figure to make changes in the gain zero for high frequency signals of lower amplitude than for signals of low frequency when the input level increases. As a result, if the characteristics of the encoders and those of the decoders are added, the total characteristic becomes linear as shown by a curve $g_0$ in FIG. 4.

If noise reduction encoders and decoders with such characteristics are used and a tape recorder, by way of example, is used as a transmission medium, the S/N ratio of a low level signal, to which masking effects are not applied so much, is improved and a signal without distortions caused by the saturation level of a magnetic tape can be obtained.

In the decoder circuit 80, the signal $L_T$ and $L_C$ are added at a matrixing circuit 81 at the amplitude ratio of 1:1. Accordingly, the crosstalk signal components $0.7L_B$ and $0.7R_B$ in the signal $L_T$ are cancelled in the matrixing circuit 81, which then produces the signal $L_F$. The signal $L_F$ is delivered to a terminal 51. The signals $R_T$ and $R_C$ are added at a matrixing circuit 84 at the amplitude ratio 1:1. Accordingly, the crosstalk signal components $0.7R_B$ and $0.7L_B$ in the signal $R_T$ are cancelled in the matrixing circuit 84, which then produces the signal $R_F$. This signal $R_F$ is delivered to a terminal 54. The signal $L_C$ is applied to a phase shifter 85 to be phase-shifted $\phi - 90°$ to form a signal $-jL_C = -j0.7L_B + 0.7R_B$, while the signal $R_C$ is applied to a phase shifter 86 to be phase-shifted by $\phi$ to form a signal $R_C$. The signal $-jL_C$ from the phase shifter 85 and the signal $R_C$ from the phase shifter 86 are added in a matrixing circuit 82 at the amplitude ratio of 0.7 : 0.7. Thus, the signal component $0.7R_B$ is cancelled in the matrixing circuit 82 and hence the signal $L_B$ is delivered, alone, to a terminal 52.

The signal $L_C$ is applied to a phase shifter 87 to be phase-shifted by $\phi$ to form a signal $L_C$, while the signal $R_C$ is applied to a phase shifter to be phase-shifted by $\phi - 90°$ to form a signal $-jR_C = j0.7R_B - 0.7L_B$. The signal $L_C$ from the phase shifter 87 and the signal $-jR_C$ from the phase shifter 88 are added in a matrixing circuit 83 at the amplitude ratio of 0.7:0.7. Thus, in the matrixing circuit 83 the signal component 0.7 $L_B$ is cancelled and only the signal $-R_B$ is obtained from the matrixing circuit 83. The signal $-R_B$ is applied to an inverter 89 and inverted into the signal $R_B$, which is delivered to a terminal 53.

As mentioned above, the signals $L_F$, $R_F$, $L_B$, and $R_B$ with no crosstalk components are obtained at the terminals 51, 54, 52, and 53, respectively, so that a four-channel stereophonic reproduction can be carried out based upon the signals $L_F$ to $R_F$ with good separation such as would be true in the case of discrete signals. In this case, moreover, the signals $L_T$ and $R_T$ have vector components that are the same as those of the signals encoded by the conventional SQ system, so that even if a record to which the invention is applied is played on conventional recording apparatus that has an SQ decoder, there is sufficient separation of the components signals, and hence, there is compatibility.

Further, in the present invention, the signals contained in the modulated carrier channel are modulated by the vestigial side band system, so that the band of the modulated carrier channel can be narrow and hence the transmission system, recording system and reproducing system are simple to construct. In addition, the S/N ratio can be improved by the noise reduction device, and the signal is transmitted through the upper and lower side bands within the frequency band in which the effects of the noise reduction device is not achieved effectively. As a result, the S/N ratio becomes good as a whole. In other words, the noise reduction operation is given to the signal of a single side band to provide a reproduced signal with good S/N ratio as a whole.

Figure 7:
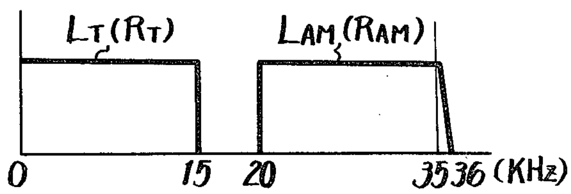
FIG. 7 is a diagram illustrating the frequency distribution of the base band and vestigial side band carrier signal according to another embodiment of this invention.

It is, however, possible that, as shown in FIG. 7, a carrier frequency of 35KHz is selected, and the lower side band is used rather than being eliminated. Only the35–36KHz portion of the upper side band is selected for use.

Further, in the above embodiment, the signals $L_B$ and $R_B$ are only included in the signals $L_C$ and $R_C$, but the signals $L_F$ and $R_F$ can be included in the signals $L_C$ and $R_C$ as shown in FIG. 8. The present invention can be applied to not only the four-channel stereo of SQ system but also to the four channel stereo of normal matrix system or other matrix systems with the like effects.

It may be apparent that many modifications and variations could be effected by one skilled in the art without departing from the spirit or scope of the novel concepts of the invention.

What is claimed is:

1. A system in which multiple signals are selectively combined, said system comprising:

A. an encoder to receive at least first, second, and third signals and to combine said three signals in predetermined amplitude and phase relationship to produce an unmodulated signal;

B. a carrier source;

C. a vestigial side band modulator connected to said carrier source and connected to receive at least said second signal as a modulating signal at a predetermined phase and amplitude relative to the phase and amplitude of said second signal applied to said encoder and to modulate the carrier therewith; and D. a combining circuit connected to said encoder and to said modulator to combine said unmodulated signal and the vestigially modulated signal as a composite signal.

2. The system of claim 1 comprising a noise reduction circuit to receive said second signal and to amplify, preferentially, high frequency, low amplitude components thereof, the output of said noise reduction circuit being connected to said modulating means.

3. The system of claim 1 comprising, in addition, second combining means for combining said third signal in predetermind amplitude and phase relationship with respect to said second signal as said modulating signal for modulating said carrier.

4. The system of claim 3 in which said second combining means comprises means to control the amplitude and phase relationship of said second and third signals in said modulating signal to be the same as the amplitude and phase relationship of said second and third signals in said unmodulated signal.

5. The system of claim 4 comprising:

A. a second encoder for receiving and combining said second and third signals and a fourth signal in predetermined amplitude and phase relationship to form a second unmodulated signal;

B. a second vestigial side band modulator connected to said carrier source;

C. third combining means for combining said third and fourth signals in predetermined amplitude and phase relationship to form a second modulating signal, said third combining means being connected to said second vestigial side band modulator to modulate said carrier to produce a second vestigially modulated signal;

D. signal-carrying means comprising a first channel to receive and carry said composite signal and a second channel to receive and carry said second unmodulated signal;

E. demodulator means to demodulate said vestigially modulated signals to retrieve said first-named and second modulating signals; and F. decoding means to combine said first and second unmodulated signals and the demodulated first-named and second modulating signals from said demodulator means in predetermined amplitude and phase relationship to recover said first, second, third and fourth signals.

6. The system of claim 5 comprising:

A. a first noise reduction circuit connected to said second combining means to receive the combined signal therefrom and to amplify, preferentially according to a predetermined, controllable transfer characteristic, low amplitude components thereof at frequencies above the maximum modulating frequency in the vestigial side band of the first-named vestigial modulator to supply thereto as a first-named modulating signal the output signal of said noise reduction circuit; and B. a second noise reduction circuit connected to said demodulating means to receive therefrom the first modulating signal to amplify, preferentially and according to the inverse of said predetermined controllable transfer characteristic, low amplitude components thereof at frequencies above the maximum modulating frequency in the vestigial side band of the first-named vestigially signal, the output of said second noise reduction circuit being connected to said decoding means to supply thereto said first-named modulating signal.

7. The system of claim 6 in which the vestigial side band of said vestigial side band modulator contains low frequency signals amplified less than said high frequency signals according to said predetermined characteristics.

8. A system for transmitting and reproducing at least four audio signals over only two channels, said system comprising:

A. an encoder comprising means for combining at least three of said signals in predetermined amplitude and phase relationship to form an unmodulated signal;

B. means for vestigially modulating a carrier signal with at least one of said three signals as a modulating signal at a predetermined phase and amplitude relative to the phase and amplitude of another of said three signals;

C. means for combining said modulated and unmodulated signals, selectively, in said channels;

D. means for separating said modulated and unmodulated signals from said channels;

E. means for demodulating said modulated signal to obtain said one signal; and

F. means to combine said separated and demodulated signals in predetermined phase and amplitude relationships relative to each other to obtain said original signals.

9. A system in which multiple signals are selectively carried in first and second channels, the first channel carrying at least first, second and third signals combined with a predetermined amplitude and phase relationship as an unmodulated signal, and said second and third signals being combined components of a modulating signal vestigially modulated on a carrier to form a first vestigially modulated signal, the amplitude and phase relationship of said components having a predetermined relationship to the amplitude and phase with respect to the amplitude and phase of said second and third signals in said unmodulated signal, said system comprising:

A. means to demodulate said vestigially modulated signal to recover said modulating signal; and B. means to combine the recovered signal and said unmodulated signal in a certain amplitude and phase relationship to recover said first signal independently of said second and third signals.

10. Th system of claim 9 in which a fourth signal is combined with said second and third signals in another predetermined amplitude and phase relationship to form a second unmodulated signal, and said second and third signals are combined as components of a second modulating signal vestigially modulated on said carrier to form a second vestigially modulated signal, the amplitude and phase relationship of said components of said second modulating signal having a certain phase relationship with respect to the amplitude and phase of said second and third signals in said second unmodulated signal, said system comprising:

A. second demodulating means to demodulate said carrier to recover said second modulating signal; and B. means to combine the recovered second modulating signal and said second unmodulated signal in a certain amplitude and phase relationship to recover said fourth signal independently of said second and third signals.

11. The system of claim 10 comprising means to combine the recovered first-named modulating signal and said recovered second modulating signal in certain amplitude and phase relationships to recover, separately, said second and third signals independently of others of said four signals.

12. The system of claim 11 in which both of said modulating signals have been compressed in the high frequency region thereof above the maximum modulating frequency in the vestigial side bands of said vestigially modulated signals, said system comprising:

A. a first noise reduction circuit connected to said demodulating means to receive the recovered first-named modulating signal therefrom and to expand the previously-compressed high frequencies of said first modulating signal; and B. a second noise reduction circuit connected to said demodulating means to receive the recovered second modulating signal therefrom and to expand the previously-compressed frequencies of said second modulating signal, said noise reduction circuits being connected between said demodulating means and the respective means to combine the recovered signals with said first and second unmodulated signals, respectively.

13. The system of claim 12 in which both of said noise reduction circuits respond to the amplitude of the respective recovered compressed signals applied thereto.

* * * * *